US006707901B1

(12) United States Patent
Hodges et al.

(10) Patent No.: US 6,707,901 B1
(45) Date of Patent: Mar. 16, 2004

(54) SUBSCRIBER PROFILE EXTENSION (SPEX)

(75) Inventors: James A. Hodges, Ottawa (CA); Jackson K. Chan, Ottawa (CA); John Visser, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/472,228

(22) Filed: Dec. 27, 1999

(51) Int. Cl.[7] .............................................. H04M 7/00
(52) U.S. Cl. ............................ 379/221.09; 379/221.12
(58) Field of Search ....................... 379/221.08, 221.09, 379/221.1, 221.11, 221.12

(56) References Cited

U.S. PATENT DOCUMENTS

| | | | | |
|---|---|---|---|---|
| 5,566,235 A | * | 10/1996 | Hetz | 379/221.02 |
| 5,625,680 A | * | 4/1997 | Foladare et al. | 379/199 |
| 5,818,920 A | * | 10/1998 | Rignell et al. | 368/10 |
| 6,018,572 A | * | 1/2000 | Foladare et al. | 379/211.01 |
| 6,128,503 A | * | 10/2000 | Granberg et al. | 455/433 |
| 6,430,271 B1 | * | 8/2002 | DeJesus et al. | 379/88.22 |

OTHER PUBLICATIONS

ITU Recommendation I.312/Q.1201 "Principles of Intelligent Network Architecture" (10/92).
ITU–T Recommendations Q.1211 "Introduction to Intelligent Network Capability Set 1" (03/93).
ITU–T Recommendations Q.1221 "Introduction to Intelligent Network Capability Set 2" (09/97).

* cited by examiner

Primary Examiner—Ahmad F. Matar
Assistant Examiner—Quynh H. Nguyen

(57) ABSTRACT

One of the features of the Intelligent Network (IN) is the storage of subscriber profile information at network databases, such as, but not limited to, service control points (SCPs) and Home Location Registers (HLRs.) Such profiles may also be stored at the local switch level, and be made accessible to all other nodes via the signaling network. The present invention extends service logic functionality for a given subscriber to allow for the interaction of subscriber profiles on behalf of a single subscriber, and sharing of data contained in these profiles, to enhance single-ended, single point-of-control services specific to either the calling or called party offered in an Intelligent Network. As such, an enhanced service tailored to both the called and calling parties is made available.

34 Claims, 6 Drawing Sheets

SUBSCRIBER PROFILE EXTENSION (SPEX)

FIELD OF THE INVENTION

This invention relates to telecommunication networks, and in particular to wireline and wireless telecommunication that maintain profiles on subscribers.

BACKGROUND OF THE INVENTION

As the demand for more sophisticated telecommunications services has increased, there has been an evolution of new networking architectures designed to meet this demand. A particular architecture which has evolved to meet customer demand for enhanced services is the Intelligent Network (IN) which enables such services to be rapidly and cost effectively introduced.

Many of the enhanced telephony services such as customized ringing, reverse charging, abbreviated dialing, etc. that customers have become accustomed to in the last few years have become available on a wide-scale basis due to the Intelligent Network. The Intelligent Network is an infrastructure standardized globally by the International Telecommunication Union (ITU) and regionally by the American National Standards Institute (ANSI) and the European Telecommunications Standards Institute (ETSI) which is being put in place and used by exchange carriers to deploy new services quickly and cost effectively. The IN infrastructure simplifies the design and implementation of new telecommunication services by defining a set of network elements, messages and call models. This allows for many services to be constructed using these standard building blocks and deployed quickly and cost effectively to end users. The principles of the intelligent network architecture are described in the ITU Recommendation I.312/Q.1201, "Principles of Intelligent Network Architecture" which is hereby incorporated by reference. Other specifications in the Q.1200-series of Recommendations provide additional technical details.

Intelligent network services are categorized into two groups, (i) those that are single-ended and requiring single point-of-control (i.e. "type A" services), and (ii) those that are multiple-ended and requiring multiple-point-of-control (i.e. "type B" services). Type A services apply to only one party in a call (single-ended). Every call associated with a type A service is influenced by only one service logic program (single point-of-control) at any one point in time (although several service logic programs may influence the call in a non-overlapping series.) Type A services are also implicitly single medium services. To date, type A services do not involve interactions between network databases associated with more than one party in a call in an IN network.

By contrast, type B services allow for services that affect multiple parties in a single call. Multiple points of control is the ability for multiple service logic instances to interact with a single call segment, and hence type B services may require interactions between network databases. Type B services include multimedia calls. While type A services have been deployed for many years, type B services, on the other hand, have not been fully deployed into Intelligent Networks around the world in part due to their complex nature. A description of type B services is included in ITU-T Recommendations Q.1211 "Introduction to Intelligent Network Capability Set 1" and Q.1221 "Introduction to Intelligent Network Capability Set 2." Type B services may be enhanced by Type A services, that is, the two categories of services are not mutually exclusive.

For wireline networks, subscriber data (or "profiles") may be stored at the local switch level, or stored in a centralized database, which is accessible to all other switching nodes. For wireless (mobile) networks, mobile subscriber profiles are invariably stored in a centralized database, since it is necessary to access a subscriber's profile from a potentially very large serving area involving multiple cooperating operators. This profile access is an essential and integral feature of wireless networks, and is becoming a key aspect of fixed networks as fixed and mobile networks are integrated. When new data is added to this centralized database, it then automatically becomes available throughout the whole network. The key aspect is access to the data.

Subscriber profiles can be constructed to contain a broad range of information for the purpose of service enhancement. For example, a subscriber profile can contain a subscriber's name, address, language preference, time-of-day restrictions, etc. There are several type A services, such as calling name delivery, calling number delivery, and incoming call screening that have been designed to use subscriber profile information. However, an inherent limitation of type A services is the lack of network database interaction, during an active call, which restricts subscriber profiles at both ends of a call from interacting with each other to enhance the service to either subscriber. As such, when a call is made from one call party to another, consideration of the profile of the other call party is not supported or considered. This lack of consideration results in services which are focused exclusively on the subscribing party's profile without consideration for the other party's profile. As for type B services which allow for network database interaction, the complexity of implementing such services makes any necessary interactions between subscriber profiles difficult except in carefully constrained circumstances.

SUMMARY OF THE INVENTION

As set out above, the Intelligent Network forms the foundation for further subscriber services deployment and enhancement. The present invention enables a new range of services and features through an extension of service logic functionality to include the support of interaction of subscriber profiles and sharing of data contained in these profiles to assist service logic processing in making better informed and hence more intelligent decisions on the service provided.

Intelligent Network architecture is characterized by the use of software configured triggers in a standardized call model. These triggers facilitate the execution of a certain event-based service on a logically (and sometimes physically) separate platform upon receipt of a predefined stimulus (e.g. the receipt of certain dialed digits). The event is considered on behalf of the subscriber for whom the service was designed. The repository for individual subscriber input/stimulus interactions is contained in the subscriber profile stored in a functional entity called Service Control Function (SCF). The SCF may be physically implemented in the (i) local switch or Service Control point (SCP) (in the case of a wireline network), or (ii) Home Location Register (HLR) or SCP (in the case of a wireless network).

The present invention relates to the extension of the above-described capability by also considering data residing in the profile of those parties with whom the subscriber interacts. If the called subscriber has a profile to support an IN based incoming call service, the present invention would enable the use of relevant data in the calling subscriber's profile, thus making possible an enhanced service tailored to both the called and calling parties. To reduce complexity, all IN services offered in accordance with the present invention are type A services, and are thus single-ended, single point-of-control. However, this invention may be applied to Type B services as enhanced by Type A services which, in turn, are enhanced by this invention.

The present invention can be implemented in a telecommunications network in a number of ways. The preferred alternative is to take advantage of the IN infrastructure to store all necessary subscriber profiles within network databases. Though another alternative would be to provide the necessary services at the switch level, this alternative does not yield the same efficiencies.

In accordance with an aspect of the present invention a method of providing a single-ended, single point-of-control service in an Intelligent Network comprises: (i) initiating a call from a calling party to a called party through a switch; (ii) suspending the call at the switch while the switch queries a first database which stores a profile of one of the calling party and the called party; (iii) the first database querying a second database which stores a profile of the other of the calling party and the called party; (iv) returning a response from the second database to the first database; and (v) proceeding with the call in accordance with the response.

In accordance with another aspect of the present invention a method is provided for an incoming call screening service in a telecommunications network which comprises: (i) a calling party initiating a call to a called party through a switch; (ii) suspending the call at the switch while the switch queries a Service Control Function (e.g. SCP) which stores a profile of the called party; (iii) the Service Control Function which stores a profile of the called party querying a database which stores a profile of the calling party, the profile of the calling party containing the preferred language of the calling party; (iv) returning the profile of the calling party to the Service Control Function which stores a profile of the called party; and (v) transmitting an announcement to the calling party in the preferred language of the calling party.

In accordance with yet another aspect of the present invention a method is provided for a call delivery service in a telecommunications network which comprises: (i) a calling party initiating a call to a called party through a switch; (ii) suspending the call at the switch while the switch queries a Service Control Function which stores a profile of the calling party; (iii) the Service Control Function which stores a profile of the calling party querying a database which stores a profile of the called party, the profile of the called party containing the time zone where the called party is located; (iv) returning the profile of the called party to the service control point which stores a profile of the calling party; and (v) the Service Control Function which stores a profile of the calling party allowing or disallowing the call to proceed depending on the time zone where the called party is located.

In accordance with yet another aspect of the present invention a method is provided a computer program product for programming a network element in an Intelligent Network to offer a single-ended, single point-of-control service, the computer program product having a medium with a computer program embodied thereon, the computer program comprising computer program code for: (i) suspending a call from a calling party to a called party at a switch while the switch queries a first database which stores a profile of one of the calling party and the called party; (ii) the first database querying a second database which stores a profile of the other of the calling party and the called party; (iii) returning a response from the second database to the first database; and (iv) proceeding with the call in accordance with the response.

In accordance with yet another aspect of the present invention there is provided a telecommunication network comprising a switch, the switch connected to a first database storing the profile of one of a calling party and a called party, and the first database connected to a second database storing the profile of the other of a calling party and a called party, wherein upon the initiation of a call from a calling party to a called party, through the switch, the switch suspends the call while the switch queries the first database, the first database queries the second database, and the second database returns a response to the first database, the switch then proceeding with the call in accordance with the response.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENT

Figure 1:
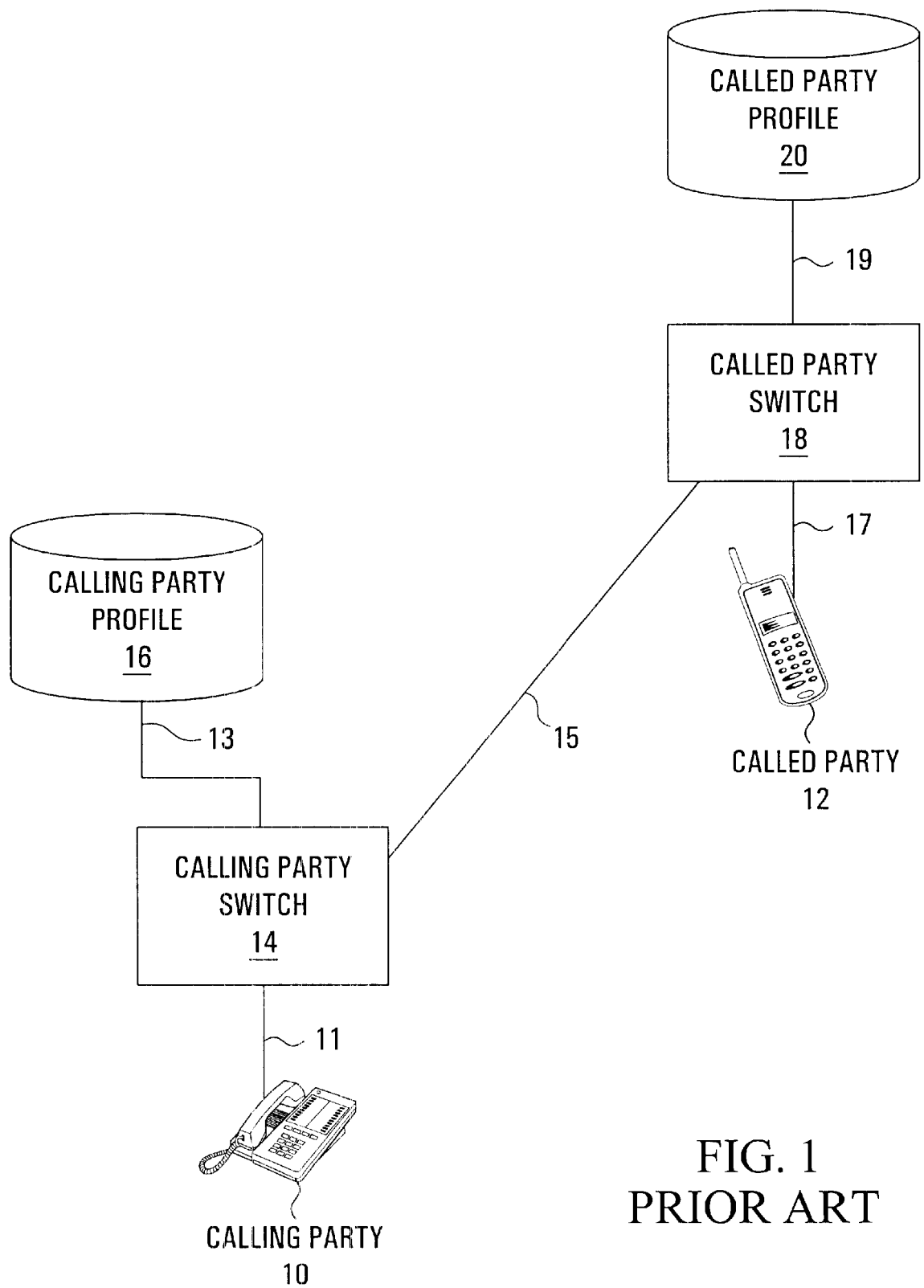
FIG. 1 is a schematic diagram of a typical prior art pre-Intelligent Network (pre-IN) telecommunications network configuration.

FIG. 1 is a schematic diagram of a typical pre-Intelligent Network (pre-IN) telecommunications network configuration showing the interactions between subscriber profiles in the prior art. In FIG. 1, a calling party 10, which has its customer premises equipment connected to calling party switch 14 through (wireless or wireline) connection 11, wishes to contact a called party 12, which has its customer premises equipment connected to called party switch 18 through (wireless or wireline) connection 17. To complete the call, calling party switch 14 initiates a call to called party switch 18 through connection 15.

In the prior art, any services that called party 12 subscribes to can only be accessed through a service logic program (SLP) stored with called party profile 20, which is connected to called party switch through connection 19, or stored in the switch 18 serving the called party. For example, called party 12 may subscribe to a service that requires that an announcement be played to calling party 10. Upon receipt of a call from calling party switch 14, called party switch 18 will launch a query to called party profile 20 which will result in the communication of the announcement to calling party 10. In the prior art, calling party profile 16 plays no role in the provision of services to/from called party 12. The only exception is a service such as calling party name delivery where, as a part of the service, only the subscriber data relevant to that calling party name or number delivery service is automatically transmitted from calling party profile 16 to calling party switch 14 when the call is initiated to called party switch 18.

This limitation can have a bearing on the quality of the service offered to a subscriber. Suppose, for example, that calling party 10 speaks a different language than that local to the serving area for called party 12. While called party profile 20 can store a language preference for called party 12, no such language preference is available at called profile 20 for calling party 10. The language preference for calling party 10 is stored in calling party profile 16, which, as explained above, plays no role in the provision of this service. In these circumstances, calling party 10 may be played an announcement that he/she will not be able to comprehend.

The impediments of the prior art are further illustrated by an example where called party 12 is a wireless subscriber. In that case, connection 17 to called party switch 18 would be a wireless connection, but all other elements of FIG. 1 would remain unchanged. Suppose in this scenario, wireless called party 12 has roamed far outside its normal calling area, to a calling area that is in another time zone. In accordance with the prior art, called party 12 can subscribe to a service that can apply some limits to the acceptance of calls outside a preset window of time, for example, before 11:00 P.M. local time. However, this service will apply equally to all calls and may therefore inappropriately block calls local to where the subscriber is roaming. Alternatively, wireless called party 12 can subscribe to a service that will allow or disallow calls from a particular calling party. Of course, this will be without regard to the roaming activity of called party 12.

What is unavailable in the prior art is a query between calling party profile 16 and called party profile 20 that will enable a determination to be made, on a per call, per calling party basis, of whether it is an appropriate local time for a call to be connected to wireless called party 12, or whether a call still qualifies for acceptance in a roaming scenario.

In summary, the present invention allows interaction between called party profile 20 and calling party profile 16 to allow for the sharing and reconciliation of data to enhance a service to calling party 10 and/or called party 12. Through the use of the present invention, IN services can be tailored on a per call, per subscriber basis.

Figure 2:
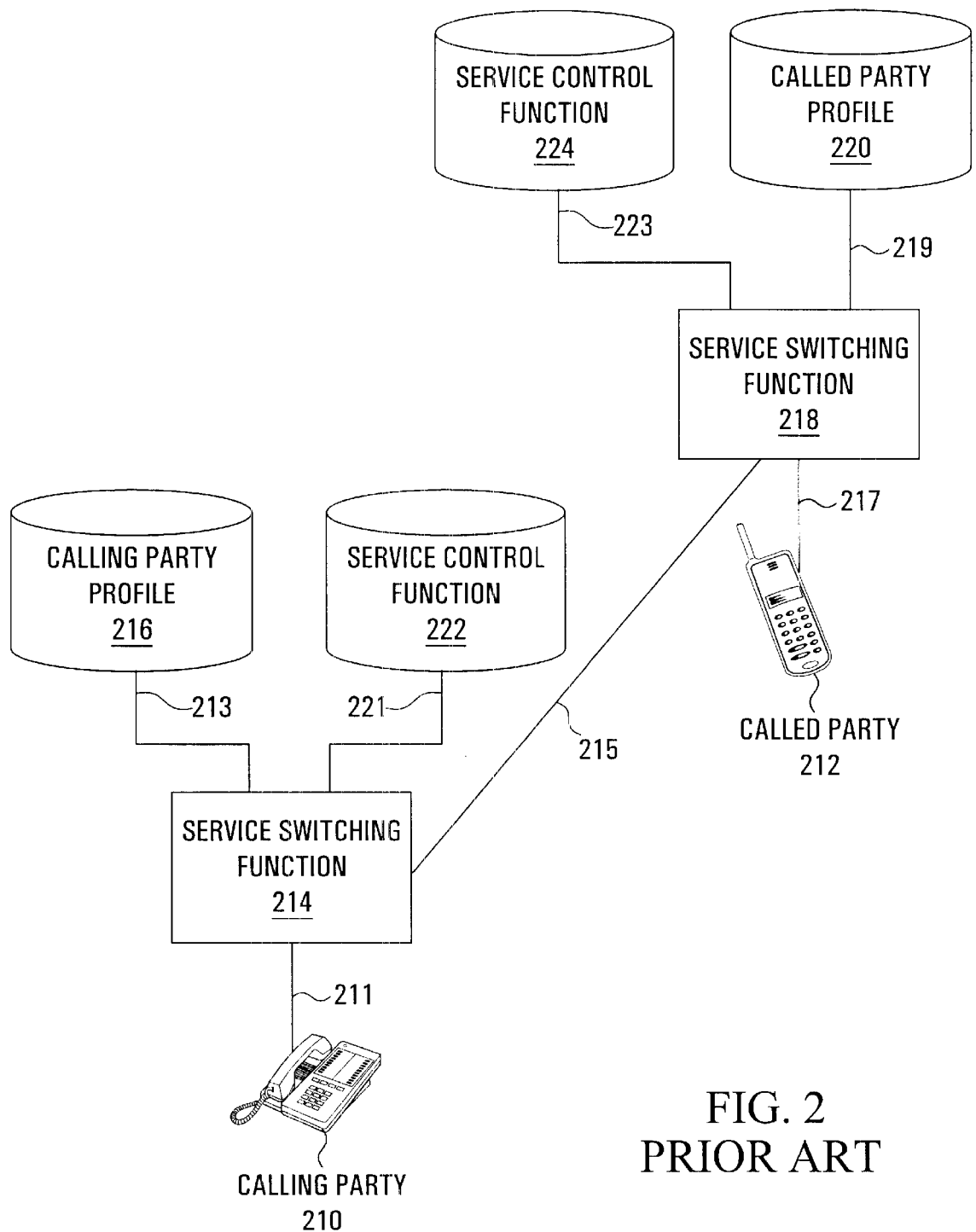
FIG. 2 is a schematic diagram of a typical prior art Intelligent Network (IN) telecommunications network configuration.

Persons skilled in the art will appreciate that there are many possible ways to implement the present invention. The preferred alternative is to take advantage of the IN infrastructure to store all necessary subscriber profiles within network databases. FIG. 2 is a schematic diagram of a typical prior art Intelligent Network (IN) telecommunications network configuration. A calling party 210 has its customer premises equipment connected to Service Switching Function (e.g. SSP) 214 through (wireless or wireline) connection 211. Called party 212 has its customer premises equipment connected to Service Switching Function (e.g. SSP) 218 through (wireless or wireline) connection 217. To complete a call between these two parties, calling party Service Switching Function 214 initiates a call to called party Service Switching Function 218 through connection 215.

In this prior art, any services that called party 212 subscribes to can only be accessed through a service logic program (SLP) stored in the called party Service Control Function (e.g. SCP) 224, which is connected to the called party Service Switching Function 218 through connection 223. To implement these services, Service Control Function 224 may access called party profile 220 which is connected to Service Switching Function 218 through connection 219. Likewise, any services that calling party 210 subscribes to can only be accessed through a service logic program (SLP) stored in the calling party Service Control Function (e.g. SCP) 222, which is connected to the calling party Service Switching Function 214 through connection 221. To implement these services, Service Control Function 222 may access calling party profile 216 which is connected to Service Switching Function 214 through connection 213.

Figure 3:
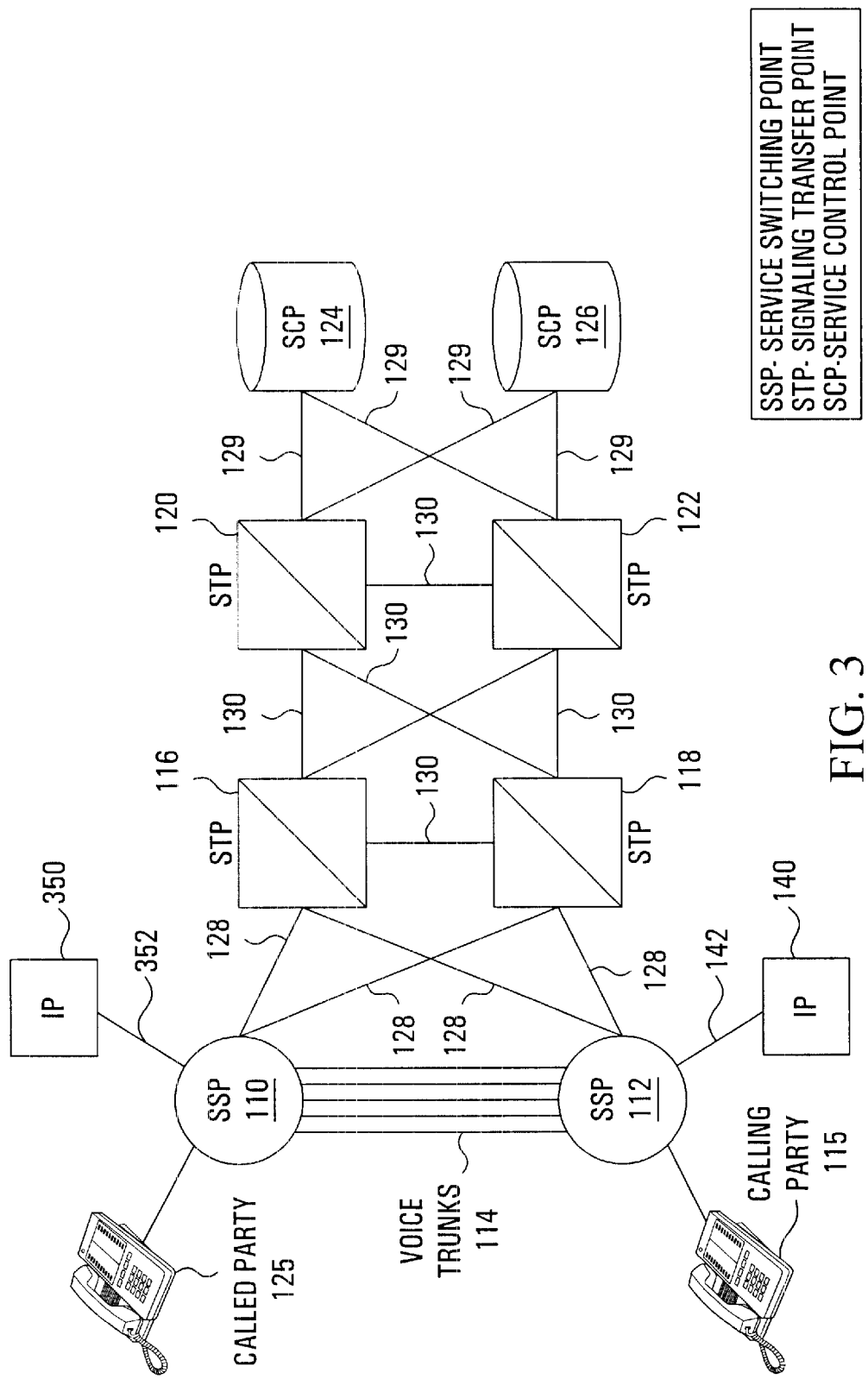
FIG. 3 is a schematic diagram of a typical Intelligent Network configuration.

FIG. 3 is a block diagram of a wireline Intelligent network that supports the present invention. The signaling protocol used in accordance with the network illustrated in FIG. is known as the Common Channel Signaling System No. 7 (CCS7) signaling protocol. The invention applies equally to other methods of transferring messages among the entities involved in processing a call. In addition to services of the type described above, the IN network illustrated in FIG. 3 is used for basic call setup, management, and tear down, and wireless services such as personal communications services (PCS), wireless roaming, and mobile subscriber authentication. Persons skilled in the art will appreciate the similarities between the wireline network illustrated in FIG. 3 and a similar typical wireless network.

There is shown in FIG. 3 two Service Switching Points (SSPs) 110, 112 connected by means of a multiplicity of voice trunks 114, four Signaling Transfer Points (STPs) 116, 118, 120, 122 in mated pair configuration, and two Service Control Points (SCPs) 124, 126, all of which are interconnected by signaling links 128, 129 and 130. A signaling link is the most basic IN entity, and is a direct physical connection between two IN nodes. Calling party 115 is shown connected to SSP 112. SSP 112 is known as the "central office" to which calling party 115 is connected. Called party 125 is connected to SSP 110, which is known as its central office.

SSPs 110, 112 are telephone switches which provide telephony services, and actually host lines and trunks containing voice and data traffic. An example of a SSP switch is the Digital Multiplex Switch (DMS®) manufactured by Nortel Networks. Unlike other nodes in an IN network, STPs 116, 118, 120, 122 do not host any lines or trunks, and do not act as a source or ultimate destination for CCS7 application messages. STPs 116, 118, 120, 122 are packet switches responsible for receiving incoming CCS7 application messages from different SSPs 110, 112 or SCPs 124, 126, and routing the messages to the appropriate destination SSP or SCP. STPs are enhanced switches containing software to recognize when call-processing at an external SCP is required. To ensure network availability, STPs 116, 118, 120, 122 are customarily deployed in mated pairs, so that if problems develop in one STP (for example 116), the mated STP (in this case 118) would provide an uninterrupted transfer of application and network management messages to all concerned nodes in the network. In FIG. 3, STPs 116, 118 are mated pairs. Similarly, STPs 120, 122 are mated pairs. STPs in a mated pair perform identical functions, and are redundant.

Links 129 connect SSPs 110, 112 to SCPs 124, 126. SCPs are network databases which contain data and service logic programs for the implementation of IN services. SCPs 124, 126 accept queries from any of SSPs 110, 112 and return the requested information to the originator of the query. For the purpose of the present description, SCP 126 will house a subscriber profile for calling party 115 and SCP 124 will house a subscriber profile for called party 125. Persons skilled in the art will appreciate that the subscriber profile for calling party 115 could alternatively be stored at SSP 112, and the subscriber profile for called party 125 could be stored at SSP 110, without changing the operation of the present invention.

The basic principle of an Intelligent Network is that it allows an SSP to stop and request information from an SCP on how to proceed at a number of points (detection points) during the processing of a call. In such a network, SSPs send and receive messages to/from an SCP that combines a large consolidated database and the service logic needed to access and use the data to apply call services. SSPs use a special set of CCS7 Transactions Capability Applications Part (TCAP) messages to dialog with the appropriate IN service logic in an SCP. (This invention applies equally to use of other application protocols to transfer the information involved.) In an SSP, call processing software provides detection points where call processing is suspended upon matching a triggering condition (see below) while a query message is sent to an SCP. SCPs that receive query messages from SSPs can instruct SSPs to continue with normal call processing, or over-ride normal call processing and perform specific actions such as: (i) collect more digits, (ii) route the call to a new directory number, (iii) route the call using a specific route list, (iv) play an announcement, or numerous other actions.

TCAP provides non-circuit related information transfer capabilities and generic services to applications in an Intelligent Network. The TCAP messaging involved in such services is not application specific. An example of TCAP messaging deployed in an IN network include the dialing of 1-800 calls, which result in TCAP queries being sent from an SSP to an SCP to resolve the non-routable 800 directory number of the called party to a network routable number. In a wireless network, when a mobile subscriber roams into a new mobile switching center (MSC) area, the local visitor location register requests service profile information from the subscriber's home location register (HLR) using mobile application part (MAP) information carried within TCAP messages.

During call processing, a number of detection points are reached where call processing can be temporarily suspended. Triggers are used to determine whether to send a message to an SCP to invoke the service logic associated with a particular detection point. Depending on the services sought by the customer, there may be one or more triggers at each detection point, that is a list of conditions which must be met before an IN message is sent. At each detection point, a call is checked for subscriptions to triggers. When a subscribed trigger is found, details of the call are checked against the criterion list associated with the trigger. If all criteria are matched, an SSP generates a query to a SCP, and suspends call processing until instructions from the SCP are received. Usually, subsequent call processing for that call will be influenced by the instruction provided by the SCP.

In the network illustrated in FIG. 3, TCAP query messages from SSP 110 to SCP 124 in response to an IN trigger are sent in TCAP format across links 128, 130, 129. Upon receipt of the query message, SCP 124 will access its service logic and database tables and construct a call control message that is returned to SSP 110 across links 129, 130, 128. SSP 110 will then use the call control message to complete the call through the network or take other action as indicated by the message received. The actual routing of the TCAP messages may vary depending on failure conditions within the signaling network.

An intelligent peripheral (IP) 140 is connected to SSP 112 by link 142. IP 140 is an intelligent telecommunications device which provides capabilities for interaction with users which may include the playback of prompts or announcements, long and short-term message recording, DTMF digit collection and detection, DTMF tone generation, message compression, call control and voice recognition. IP 140 is application independent and its capabilities can be used by multiple applications. Similarly, IP 350 is connected to SSP 110 by link 352.

Figure 4:
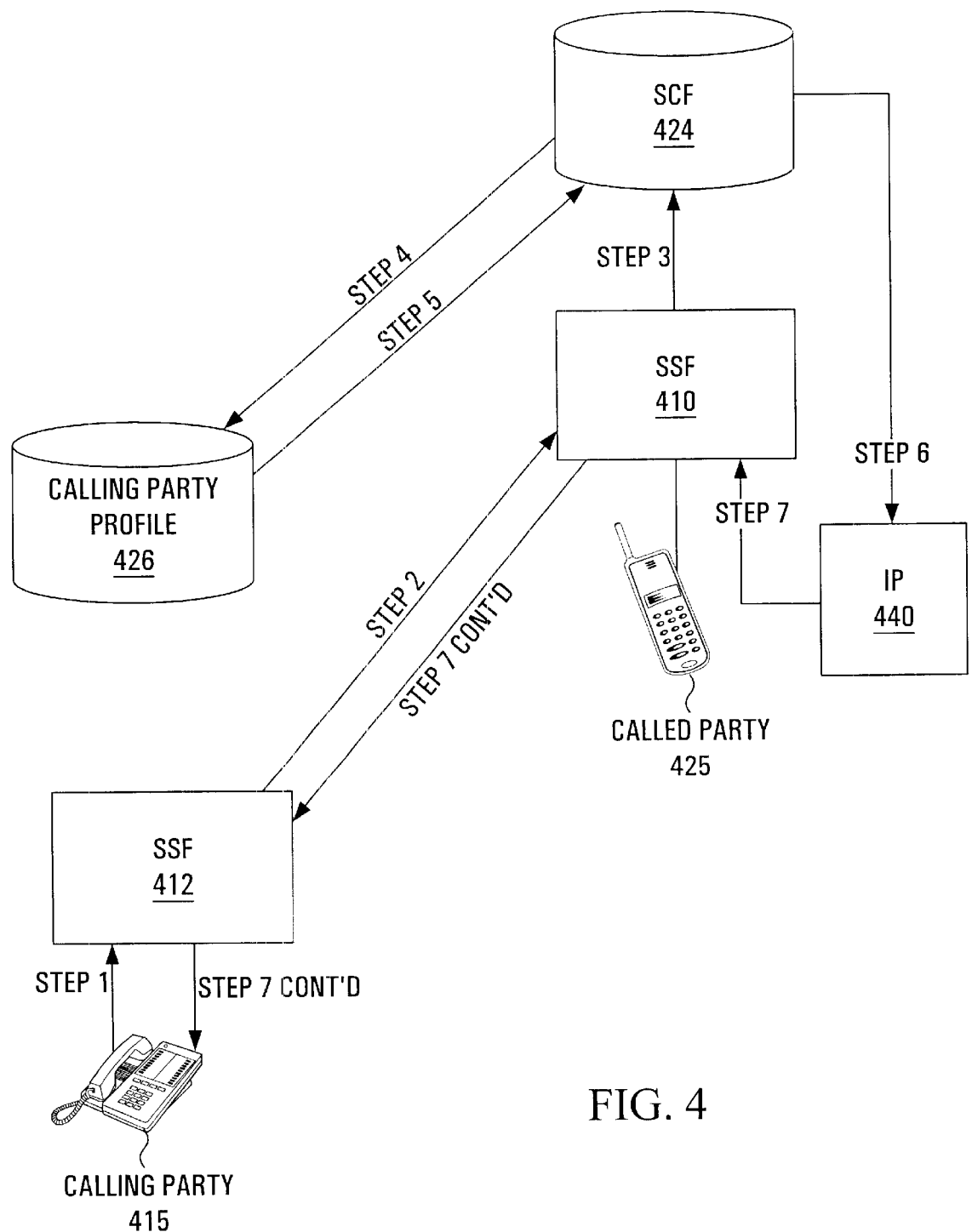
FIG. 4 is a schematic diagram of a telecommunications network showing the steps taken to implement a first service in accordance with the present invention.

FIG. 4 is a schematic diagram of a similar Intelligent Network as that illustrated in FIG. 3, with the links between the network elements removed for clarity. The arrows between the network elements are intended to show the steps taken to achieve a first enhanced service through use of the present invention. Persons skilled in the art will appreciate that the subscriber profile of called party 425 could be stored at the Service Switching Function (e.g. SSP) 410, rather than at the Service Control Function (e.g. SCP) 424, without affecting the operation of the present invention. As well, the Calling Party Profile 426 could be implemented as a standalone calling party database (e.g. HLR), or as part of a calling party Service Control Function (e.g. SCP), without affecting the operation of the present invention.

In FIGS. 4 (and 5), the invention is said to be network-based (as opposed to switch-based) with the functionality of the present invention being provided by network elements, rather than local telephone switches. Any telecommunications network, be it switch-based, IN-based, wireless (mobile) or wireline (fixed) that allows for interactions between customer profiles could be used in accordance with the present invention.

Though a wholly switch-based network could be used to implement the present invention, this type of network is not preferred since it involves a duplication of network resources. The advantage of using an IN network to implement the present invention is that service logic is transferred from the switch level to the network level.

As explained above, the prior art does not provide for any interaction between Service Control Function 424 and Calling Party Profile 426 in the provision of IN services. The present invention provides for the interaction between such network elements in order to enhance the service to the subscriber. The following steps demonstrate the use of such an interaction between Service Control Function 424 and Calling Party Profile 426 in the context of the Incoming Call Screening (ICS) service with Subscriber Specified Announcement, where the preferred language of calling party 415 is different than the preferred language of called party 425.

Step 1. Calling Party 415 goes off-hook and dials the directory number of called party 425. (If the calling party is a mobile subscriber, equivalent actions would be dialing of the number on the subscriber terminal and pressing a "send" key or equivalent to transfer the dialed number to Service Switching Function 412.)

Step 2. The call is routed by Service Switching Function 412 to Service Switching Function 410.

Step 3. Service Switching Function 410 recognizes that the call is an IN call, notes called party 425 has ICS active, and sends a query containing call information to Service Control Function 424. On receipt of the query the Service Control Function 424 starts a service logic program for the ICS service.

Step 4. Service Control Function 424 checks if it has a subscriber profile for calling party 415. If so, Service Control Function 424 moves to step 6. If not, Service Control Function 424 forwards an Information Transfer Application Protocol (e.g. TCAP) message containing a query to Calling Party Profile 426, where a subscriber profile of calling party 415 is stored.

Step 5. The entity storing Calling Party Profile 426 (be it an SCP or otherwise) responds to the query in step 4 by returning, via an Information Transfer Application Protocol (e.g. TCAP) message, a copy of the subscriber profile of calling party 415. Upon receipt of the message, Service Control Function 424 appends this information to the subscriber profile of called party 425.

Step 6. The service logic program of Service Control Function 424 executes upon the now appended subscriber profile of calling party 415 to determine an appropriate response.

Step 7. For this service, the appropriate response involves the playing of an announcement by IP 440 to calling party 415 in that party's preferred language.

Step 8. Depending on the nature of the ICS service, the call is either terminated, or the calling party 415 may continue with the call (not shown).

Without the network database interaction of the present invention, calling party 415 would have been played the announcement in the preferred language of called party 425, and that announcement might then not be understood by calling party 415.

Figure 5:
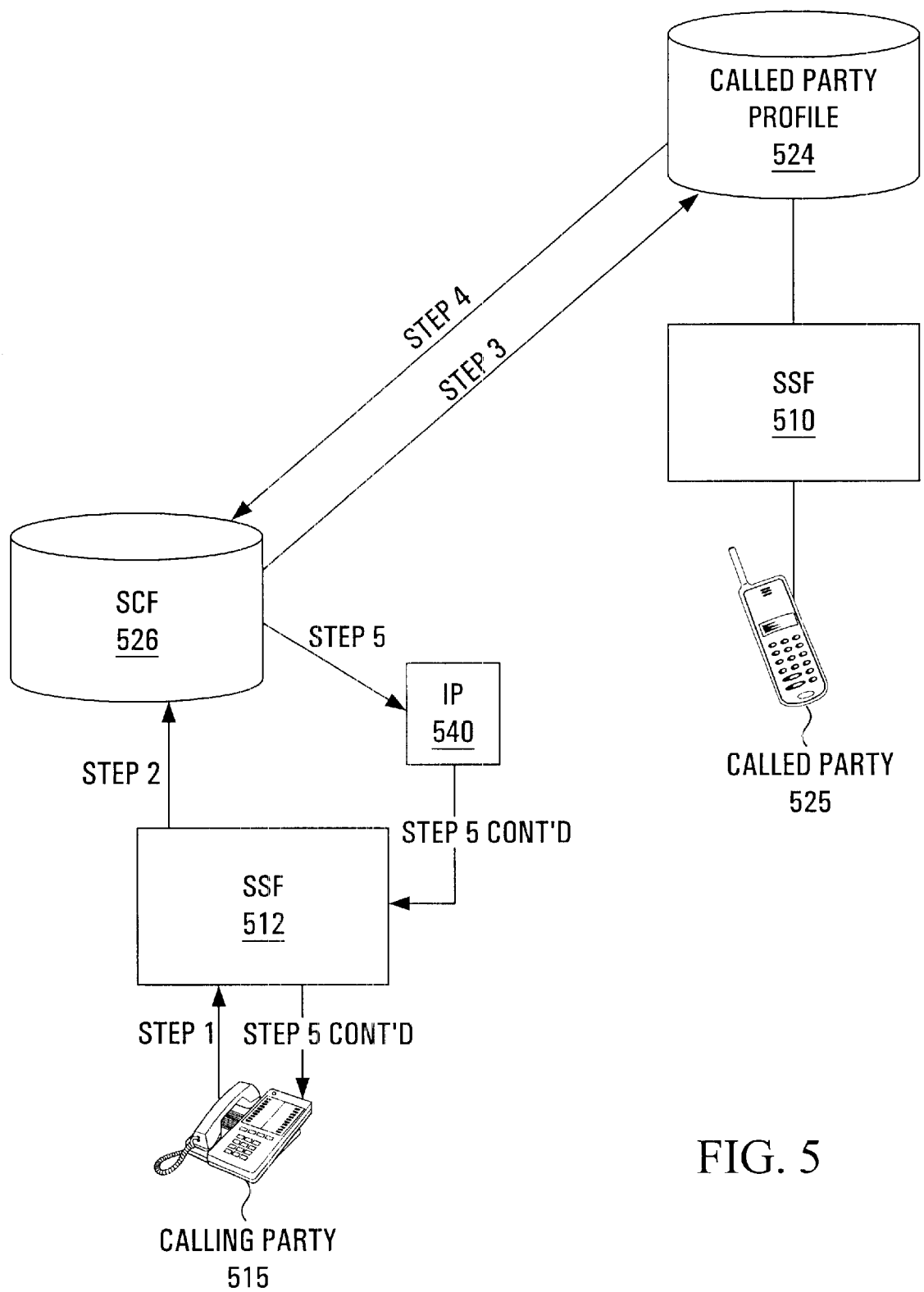
FIG. 5 is a schematic diagram of a telecommunications network showing the steps taken to implement a second service in accordance with the present invention.

FIG. 5 is a similar schematic diagram to FIG. 4, except that it is intended to show the steps taken to achieve a second enhanced service through use of the present invention. Once again, persons skilled in the art will appreciate that the subscriber profile of calling party 515 could be stored at the Service Switching Function (e.g. SSP) 512, rather than at the Service Control Function (e.g. SCP) 526, without affecting the operation of the present invention. As well, the Called Party Profile 524 could be implemented as a standalone called party database (e.g. HLR), or as part of a called party Service Control Function (e.g. SCP), without affecting the operation of the present invention. In this case, the following steps demonstrate the use of such an interaction between Called Party Profile 524 and Service Control Function 526 in the context of a call delivery service, which allows/disallows calls to a wireless called party 525 during certain time periods of the day or night.

Step 1. Without being aware that wireless called party 525 has roamed to a different time zone, calling party 515 goes off-hook and dials the directory number of called party 525.

Step 2. Service Switching Function 512 notes that calling party delivery service is active and the call is routed to Service Control Function 526.

Step 3. On receipt of the query, Service Control Function 526 starts a service logic program for the call delivery service. Service Control Function 526 forwards an Information Transfer Application Protocol (e.g. TCAP) message containing a query to Called Party Profile 524 to determine the time zone of called party 525. (This information is available in relation to the roaming information stored as part of the Called party profile 524 when called party 525 is roaming.) This query uses existing standard profile queries as already implemented and deployed in support of registration of subscribers.

Step 4. The service logic program of Called Party Profile 524 responds to the query in step 3 by returning, via an Information Transfer Application Protocol (e.g. TCAP) message, the requested time zone information. For mobile subscribers, the time zone will be a function of the geographic location to which they have roamed, and may vary considerably from the time zone of their "home" location. Upon receipt of the message, Service Control Function 526 appends this information to the subscriber profile of calling party 515.

Step 5. The service logic program of SCF 526 executes upon the now appended subscriber profile of calling party 515 to determine an appropriate response. For this service, the appropriate response involves the playing of an announcement by IP 540 to calling party 515 indicating that called party 525 is in a different time zone. Calling party 515 is then offered a choice of call dispositions such as whether to continue the call or abandon it or route to a voice mail system. If the time is inappropriate, calling party 515 may decide to abandon the call or select from any other of the alternatives that may be offered.

Without the network database interactions of the present invention, calling party 515 would have no way of knowing that called party 525 had roamed to a different time zone, and that it was not an appropriate time to call.

The present invention is typically implemented using a computer program product that forms part of the service logic of a network database, such as Called Party Profile 524 or Service Control Function 526. The computer program product may also form part of Service Switching Functions 510 and/or 512. Appropriate computer program code in combination with such network elements implements the elements of the present invention. This computer program code is often stored on a storage medium, such as a diskette, hard disk, CD-ROM, or tape. The medium can also be a memory storage device or collection of memory storage devices such as read-only memory (ROM) or random access memory (RAM).

Figure 6:
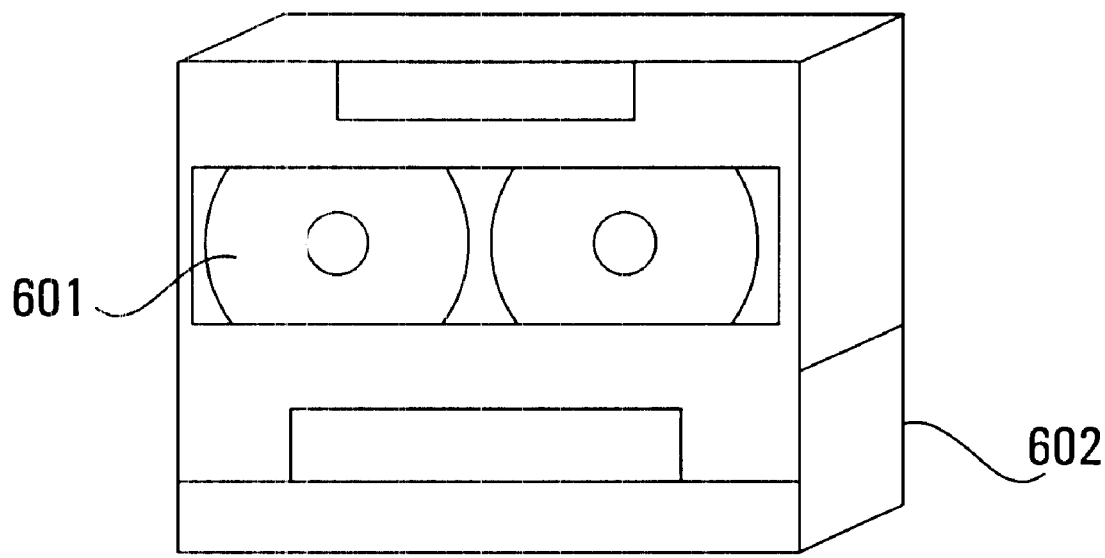
FIG. 6 shows one example of a medium on which a computer program which implements the present invention may be stored.

FIG. 6 illustrates one example of a storage medium. FIG. 6 shows a tape cartridge of the type where magnetic medium 601 is enclosed in a protective cassette 602. Magnetic field changes over the surface of the magnetic media 601 are used to encode the computer program code.

The above description of a preferred embodiment should not be interpreted in any limiting manner since variations and refinements can be made without departing from the spirit of the invention. The scope of the invention is defined by the appended claims and their equivalents.

We claim:

1. A method of providing a single-ended, single point-of-control service in an Intelligent Network comprising:

initiating a call from a calling party to a called party through a switch;

suspending the call at the switch while the switch queries a first database which stores a first profile of one of the calling party and the called party;

the first database querying a second database which stores a second profile of the other of the calling party and the called party;

returning a response from the second database to the first database, said response including at least a portion of the second profile;

appending the at least a portion of the second profile to the first profile to form an appended profile; and proceeding with the call in accordance with the appended profile.

2. The method of claim 1 wherein the first database querying a second database which stores a profile of the other of the calling party and the called party comprises:

generating a CCS7 query message at the first database; and forwarding said CCS7 query message to the second database.

3. The method of claim 1 wherein returning a response from the second database to the first database comprises:

generating a CCS7 response message at the second database; and forwarding said CCS7 response message to the first database.

4. The method of claim 3 further including appending the profile of one of the calling party and the called party to said CCS7 response message.

5. The method of claim 1 wherein the first database is stored in a Service Control Function.

6. The method of claim 5, wherein the Service Control Function is a Service Control Point.

7. The method of claim 5 wherein the Service Control Function is a Home Location Register.

8. The method of claim 1 wherein the second database is stored in a Service Control Function.

9. The method of claim 8 wherein the Service Control Function is a Service Control Point.

10. The method of claim 8 wherein the Service Control Function is a Home Location Register.

11. A method of providing an incoming call screening service in a telecommunications network comprising:

a calling party initiating a call to a called party through a switch;

suspending to call at the switch while the switch queries a Service Control Function which stores a profile of the called party;

the Service Control Function which stores a profile of the called party querying a database which stores a profile of the calling party, the profile of the calling party containing the preferred language of the calling party;

returning the profile of the calling party to the Service Control Function which stores a profile of the called party;

appending the profile of the calling to the profile of the called party; and transmitting an announcement to the calling party in the preferred language of the calling party.

12. The method of claim 11 wherein the Service Control Function is a Service Control Point.

13. The method of claim 11 wherein the Service Control Function is a Home Location Register.

14. A method of providing a call delivery service in a telecommunications network comprising:

a calling party initiating a call to a called party through a switch;

suspending the call at the switch while the switch queries a Service Control Function which stores a profile of the calling party;

the Service Control Function which stores a profile of the calling party querying a database which stores a profile of the called party, the profile of the called party containing the time zone where the called party is located;

returning the profile of the called party to the service control point which stores a profile of the calling party;

appending the profile of the called party to the profile of the calling party; and the Service Control Function which stores a profile of the calling party allowing or disallowing the call to proceed depending on the time zone where the called party is located.

15. The method of claim 14 wherein the Service Control Function is a Service Control Point.

16. The method of claim 14 wherein the Service Control Function is a Home Location Register.

17. A computer program product for programming a network element in an Intelligent Network to offer a single-ended, single point-of-control service, the computer program product having a medium with a computer program embodied thereon, the computer program comprising computer program code for:

suspending a call from a calling part to a called party at a switch while the switch queries a first database which stores a first profile of one of the calling party and the called party;

the first database querying a second database which stores a second profile of the other of the calling party and the called party;

returning a response from the second database to the first database, said response including at least a portion of the second profile;

appending the at least a portion of the second profile to the first profile to form an appended profile; and proceeding with the call in accordance with the appended profile.

18. The computer program product of claim 17 wherein the switch is a Service Switching Function.

19. The computer program product of claim 18 wherein the Service Switching Function is a Service Switching Point.

20. The computer program product of claim 17 wherein the first database is stored in a Service Control Function.

21. The computer program product of claim 20, wherein the Service Control Function is a Service Control Point.

22. The computer program product of claim 20 wherein the Service Control Function is a Home Location Register.

23. The computer program product of claim 17 wherein the second database is stored in a Service Control Function.

24. The computer program product of claim 23 wherein the Service Control Function is a Service Control Point.

25. The computer program product of claim 23 wherein the Service Control Function is a Home Location Register.

26. A telecommunication network comprising a switch, the switch connected to a first database storing a first profile of one of a calling party and a called party, and the first database connected to a second database storing a second profile of the other of a calling party and a called party, wherein upon the initiation of a call from a calling party to a called party, through the switch, the switch suspends the call while the switch queries the first database, the first database queries the second database, and the second database returns a response to the first database, said response including at least a portion of the second profile, the switch then appending the at least a portion of the second profile to the first profile to form an appended profile and proceeding with the call in accordance with the appended profile.

27. The telecommunications network of claim 26 wherein the first database is stored in a Service Control Function.

28. The telecommunications network of claim 27 wherein the Service Control Function is a Service Control Point.

29. The telecommunications network of claim 27 wherein the Service Control Function is a Home Location Register.

30. The telecommunications network of claim 26 wherein the second database is stored in a Service Control Function.

31. The telecommunications network of claim 30 wherein the Service Control Function is a Service Control Point.

32. The telecommunications network of claim 30 wherein the Service Control Function is a Home Location Register.

33. The telecommunications network of claim 26 wherein the switch is a Service Switching Function.

34. The telecommunications network of claim 33 wherein the Service Switching Function is a Service Switching Point.

* * * * *

UNITED STATES PATENT AND TRADEMARK OFFICE
CERTIFICATE OF CORRECTION

PATENT NO. : 6,707,901 B1
DATED : March 16, 2004
INVENTOR(S) : James Hodges et al.

It is certified that error appears in the above-identified patent and that said Letters Patent is hereby corrected as shown below:

Column 11,
Line 16, "...claim 5, wherein..." should read -- ...claim 5 wherein... --
Line 29, "suspending to call..." should read -- suspending the call... --
Line 39, "...calling part to..." should read -- ...calling party to... --

Column 12,
Line 30, "...claim 20, wherein..." should read -- ...claim 20 wherein... --

Signed and Sealed this

Twenty-first Day of December, 2004

JON W. DUDAS
*Director of the United States Patent and Trademark Office*